United States Patent [19]

Dean

[11] 4,020,275

[45] Apr. 26, 1977

[54] SUPERCONDUCTING CABLE COOLING SYSTEM BY HELIUM GAS AT TWO PRESSURES

[75] Inventor: John W. Dean, Los Alamos, N. Mex.

[73] Assignee: The United States of America as represented by the United States Energy Research and Development Administration, Washington, D.C.

[22] Filed: Jan. 27, 1976

[21] Appl. No.: 649,888

[52] U.S. Cl. .......................... 174/15 S; 174/15 CA
[51] Int. Cl.² ...................................... H01B 12/00
[58] Field of Search .......... 174/15 C, 15 CA, 15 S, 174/126 S, 128 S; 62/62

[56] References Cited

UNITED STATES PATENTS

| 3,162,716 | 12/1964 | Silver | 174/15 S |
|---|---|---|---|
| 3,292,016 | 12/1966 | Kafka | 174/15 S X |
| 3,432,783 | 3/1969 | Britton et al. | 174/126 S X |
| 3,463,869 | 8/1969 | Cooley et al. | 174/15 S |
| 3,634,597 | 1/1972 | Ziemek et al. | 174/15 S |
| 3,638,154 | 1/1972 | Sampson et al. | 174/126 S |
| 3,646,243 | 2/1972 | Graneau et al. | 174/15 S |
| 3,697,665 | 10/1972 | Doose et al. | 174/15 S |
| 3,720,777 | 3/1973 | Sampson et al. | 174/15 S |
| 3,749,811 | 7/1973 | Bogner et al. | 174/15 S |
| 3,800,062 | 3/1974 | Kataoka et al. | 174/15 S |
| 3,808,351 | 4/1974 | Moisson-Franckhauser et al. | 174/15 S |
| 3,864,508 | 2/1975 | Beck | 174/15 S |
| 3,902,000 | 8/1975 | Forsyth et al. | 174/15 CA |
| 3,917,897 | 11/1975 | Hildebrandt | 174/15 S |
| 3,946,141 | 3/1976 | Schmidt | 174/15 S |
| 3,950,606 | 4/1976 | Schmidt | 174/15 S |

OTHER PUBLICATIONS

E. B. Forsyth, et al., *The Technical Feasability of Superconducting Power Transmission: a case study*, IEEE Power Engineering Society, 5-74, pp. 161-170.

H. M. Long, et al., *Design Features of AC Superconducting Cables*, Journal of Applied Physics, vol. 42, No. 1, Jan. 1971, pp. 155-162.

K. Haga, et al., *Development of Liquid–Nitrogen–Cooled Cable*, IEEE Conference Dallas, Tex. 1974, Underground Transmission & Distribution Conference.

*Primary Examiner*—Arthur T. Grimley
*Attorney, Agent, or Firm*—Dean E. Carlson; Leonard Belkin; Cornell D. Cornish

[57] ABSTRACT

Thermally contacting, oppositely streaming, cryogenic fluid streams in the same enclosure in a closed cycle that changes the fluid from a cool high pressure helium gas to a cooler reduced pressure helium gas in an expander so as to be at different temperature ranges and pressures respectively in go and return legs that are in thermal contact with each other and in thermal contact with a longitudinally extending superconducting transmission line enclosed in the same cable enclosure that insulates the line from the ambient at a temperature $T_1$. By first circulating the fluid from a refrigerator at one end of the line as a cool gas at a temperature range $T_2$ to $T_3$ in the go leg, then circulating the gas through an expander at the other end of the line where the gas becomes a cooler gas at a reduced pressure and at a reduced temperature $T_4$ and finally by circulating the cooler gas back again to the refrigerator in a return leg at a temperature range $T_4$ to $T_5$, while in thermal contact with the gas in the go leg, and in the same enclosure therewith for compression into a higher pressure gas at $T_2$ in a closed cycle, where $T_2 > T_3$ and $T_5 > T_4$, the fluid leaves the enclosure in the go leg as a gas at its coldest point in the go leg, and the temperature distribution is such that the line temperature decreases along its length from the refrigerator due to the cooling from the gas in the return leg.

10 Claims, 2 Drawing Figures

SUPERCONDUCTING CABLE COOLING SYSTEM BY HELIUM GAS AT TWO PRESSURES

STATEMENT OF GOVERNMENT INTEREST

This invention was made in the course of, or under a contract with the United States Energy Research and Development Administration, or its predecessor, The United States Atomic Energy Commission.

CROSS-REFERENCE TO RELATED APPLICATIONS:

Ser. No. 523,182 Filed: Nov. 12, 1974 U.S. Pat. No. 3,902,000
By: Forsyth et al.
On: Termination for Superconducting Power Transmission Systems
Ser. No. 649,887 Filed: Jan. 27, 1976
By: John W. Dean
On: Superconducting Cable Cooling System by Helium Gas and a Mixture of Gas and Liquid Helium

BACKGROUND OF THE INVENTION

In the field of superconducting transmission lines, the transmission line cable and cable containment envelope terminate at the cold end of a pothead termination or terminal at each end of the line so that the cryogenic cooling fluid for maintaining the line below its superconducting critical temperature can enter at one end of the cable enclosure and exit from the other end thereof. Referring to FIG. 1a of the above cited Forsyth et al. U.S. Pat. No. 3,902,000, which is incorporated by reference herein, 7° K cooling fluid enters as a high density gas at one end and exits at the other end in a go leg, and returns to the refrigerator in a separate enclosure at 100° K so that the coldest end of the transmission line is nearest the refrigerator.

SUMMARY OF THE INVENTION

The invention provides cryogenic cooling apparatus having counterstreaming gas and gas coolant streams at different pressures and temperature ranges in the same enclosure for use with a superconducting transmission line having an insulating enclosure with opposite terminals at ambient temperature, comprising a cryogenic cooling fluid, a superconducting transmission line forming a first channel for circulating the cryogenic cooling fluid as a gas at a first decreasing temperature range and constant high pressure in a first go direction, enclosure means encircling the transmission line and forming a second channel in thermal contact with the first channel and the transmission line for circulating the cryogenic cooling fluid as a gas at a second increasing temperature range and constant low pressure in a second return direction opposite to the first go direction, means for circulating the cryogenic fluid as a gas in the first channel in the enclosure means at said first decreasing temperature range and constant pressure, and means for circulating the fluid as a gas in the second channel at a second reduced pressure and increasing temperature range in the same enclosure to provide oppositely streaming cryogenic fluid streams in the same enclosure in a closed cycle at said different temperature ranges and pressures, respectively. With the proper selection of fluids and apparatus and steps, as discussed in more detail hereinafter, the desired superconducting transmission line cable cooling system is provided.

OBJECTS OF THE INVENTION

It is an object of this invention, therefore, to provide improved cryogenic cooling apparatus and method for a superconducting transmission line by providing thermally contacting, oppositely streaming cryogenic fluid streams at different pressures and in a closed cycle;

Another object is to counterstream a cryogenic cooling fluid in the same enclosure in a closed cycle in a gaseous streams in thermal contact with each other and a superconducting cable so that the gas leaves the cable in its go leg near its coldest point;

Another object is to circulate cryogenic cooling fluid streams in the same enclosure in a closed cycle through a superconducting transmission line having a refrigerator and an expander at the opposite ends of the transmission line.

BRIEF DESCRIPTION OF THE DRAWINGS

In the drawings, where like elements are referenced alike.

DESCRIPTION OF THE PREFERRED EMBODIMENT

This invention is useful for cooling superconducting cables for power line transmission. For example, this invention is useful for cooling a $Nb_3Sn$ or a $Nb_3Ge$ superconducting cable to an operating temperature of between about 7.3–12 K for supplying power to the Brookhaven National Laboratory.

Figure 1:
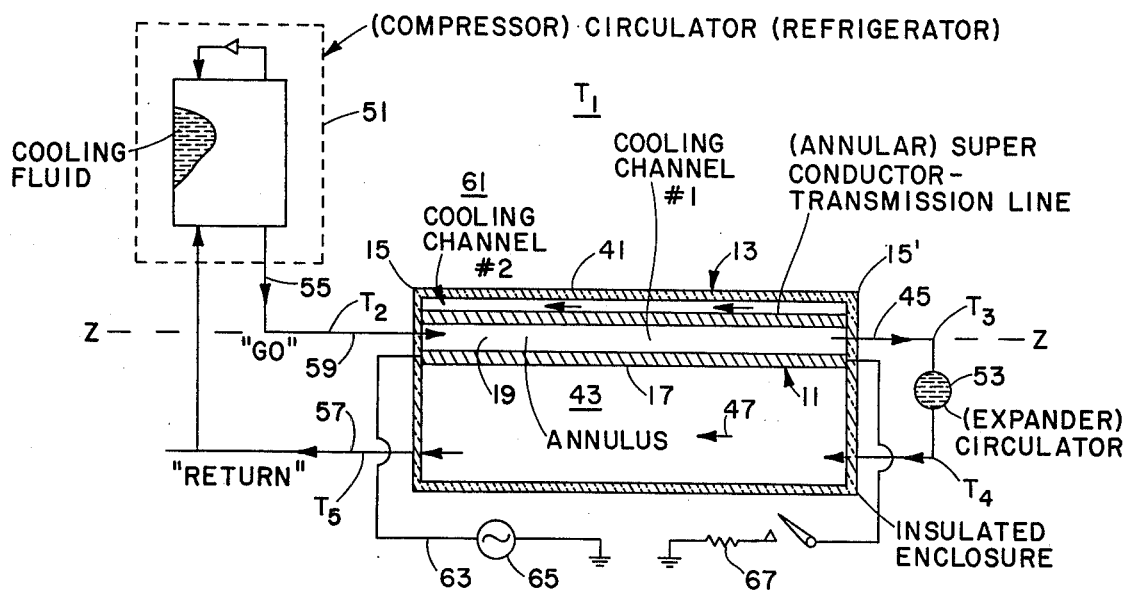
FIG. 1 is a partial schematic illustration of one embodiment of the superconducting transmission line of this invention.

Referring to FIG. 1, a superconducting transmission line is shown in FIG. 1 and described in U.S. Pat. No. 3,720,777, and U.S. Pat. No. 3,902,000, which are incorporated by reference herein. This transmission line comprises an insulating enclosure 13, terminals 15 and 15' at ambient temperature, and spaced apart, insulated, parallel, fluxjump stabilized, multilayer ribbons or braided, composite-structure, flexible superconducting means 17 that are annularly wound to form a cooling channel 19, the materials and fabrication techniques therefore being disclosed by U.S. Pat. Nos. 3,638,154; and 3,432,783 and/or 3,423,706, which are also incorporated by reference herein. Transmission of electrical power in this type of transmission line through these superconducting means is based on the fact that the line loses all electrical resistance when it is cooled to a temperature below its critical superconducting temperature.

One way of cooling a transmission line 11 employing annularly wound $Nb_3Sn$ or $Nb_3Ge$ superconductor means 17 to a temperature below the critical superconducting temperature thereof, is to circulate a coolant as a high pressure gas through a central, cylindrical, longitudinally extending, enclosed cooling channel 19 formed on the inside of the superconducting means by the annular windings and the insulation therebetween along a path between the two opposite end terminals 15 and 15' at the center of the insulating enclosure 13 and along the z—z axis of the transmission line 11 so that the gas cools the superconductor in the go direction. In the practical arrangement shown in FIG. 1 the cable insulating enclosure 13 is a conventional dewar manufactured by Kabelmetal or Cryenco. One embodiment of the invention hereinafter described utilizes a superconducting transmission line 11 and an enclosure 13 of this type in which the annular space 41 between the outside of the cylindrical superconducting means 17 and the inside of the enclosure 13 is subjected to a counter-circulating cryogenic gas 43 in thermal contact with the superconducting means 17, the central cooling channel 19 and the high pressure gas coolant in the central cooling channel 19 in a manner described below in connection with particular configurations of these elements for forming oppositely streaming "go" and "return" leg directions 45 and 47 that are in thermal contact with each other and the superconducting means 17, so that the high pressure gas coolant circulating in the coolant channel 19, which forms the "go" leg, leaves the transmission line cable near its coldest point, and the temperature distribution is such that the transmission line temperature decreases in the "go" direction along its length. An experimental demonstration of the principles involved in this invention, which are understood in the art from the description herein, is given in Brookhaven National Laboratory Report BNL 19742 by the inventor herein and another working at the behest and under the direction of the inventor herein, the other co-author being listed as a co-author only to give him credit for his collaboration with the inventor herein on the research program described in BNL 19742.

In order to explain how the method and apparatus of this invention accomplish the function of decreasing the temperature of the transmission line 11 in the "go" direction, reference is made to FIG. 1, wherein is illustrated a refrigerator 51 and an expander 53 disposed at opposite ends of a transmission line that is annularly wound into a gas-tight tube to form a central cylindrical channel and an outer annulus 41 in enclosure 13 for separating the coolant respectively into a high pressure and a lower pressure gases that are circulated in a closed cycle at different temperature ranges and pressures in thermally connected, counterstreaming, oppositely directed cryogenic fluid streams 55 and 57 in the "go" and return leg directions 45 and 47 in the same enclosure 13. Consider a path 59 taken by the coolant after it leaves the refrigerator 51 as a high pressure gas at a temperature $T_2$ at a first pressure $P_1$ as a result of the operation of the refrigerator, which is arranged to compress the coolant and to remove heat therefrom to the ambient 61 at a temperature $T_1$. It will be seen that the cryogenic cooling fluid circulates along the transmission line between the end terminals 15 and 15' in the "go" direction and cools the superconducting means 17 to a temperature below its critical superconducting temperature so that the transmission line transmits electrical power without resistance between the opposite terminals by suitably connecting the transmission line in a circuit 63 having a power source 65 and a load 67.

Figure 2:
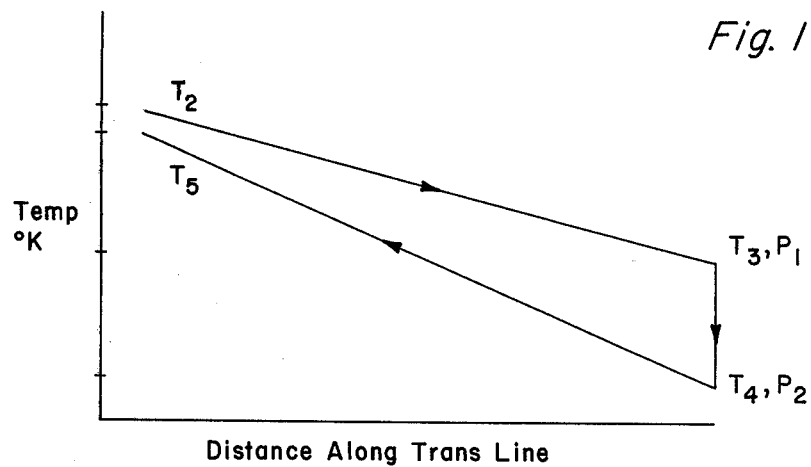
FIG. 2 is a graphic illustration of the temperature and pressure of the cryogenic cooling fluid versus distance along the transmission line of FIG. 1.

Should the coolant leave transmission line through terminal 15' at $T_3$, where an expander 53 expands the high pressure gas coolant to a gas 43 at a second lower pressure $P_2$, the expansion cools the gas to a temperature $T_4$, and by circulating the cool gas 43 back again to the refrigerator 51 in the "return" direction 47 along the outside of the superconductor 17 in annular space 41 in thermal contact with the high pressure gas in channel 19, the return gas will cool the high pressure gas so that the high pressure gas exits from terminal 15' at its coldest temperature, and the temperature distribution along the transmission line will decrease in the "go" direction from terminal 15 to terminal 15', as illustrated by FIG. 2.

In operation, the annularly wound superconductor which has conventional insulation of potting compound forms a partition between the high and low pressure fluids in the "go" and "return" legs. Also, conventional insulators, compressors, refrigerators, expansion engines and valves are used, as described in the copending application filed concurrently herewith and incorporated by reference herein. Here, however, the temperature of the transmission line is skewed to decrease in the go direction and increase in the return direction. To this end, the coolant remains supercritical in both directions, and the cross-sectional area of the return leg is greater than in the go leg. Also, the transmission line forms a gas tight partition between the high and low pressure streams, and the total effect is to keep the superconductor below its critical current and temperature along the whole longitudinally extending length of the tranmission line.

Advantageously, in one example the high pressure gas in the "go" direction is helium at 15–20 atm. that decreases in temperature from 12–9.4° K, and the gas in the "return" direction is at least 3–5 atm. and increases from 7.3–11° K, so as to maintain the gas always supercritical, i.e., everywhere above 2.25 atm. and up to between only about 7.3–12° K for a $Nb_3Sn$ or $Nb_3Ge$ superconductor. The use of a "return" leg that has a larger cross-sectional area than the input in the "go" direction is to reduce friction. This is convenient, since the return surrounds the input in the "go" direction.

In another example, the performance of the enclosure 13 may be calculated from data, such as shown in FIG. 2. The temperature of the coolant leaving the expansion means (point $T_4$ in FIG. 2) is 7.3 K and rises to 11° K as it returns to the refrigerator 51. This temperature rise from $T_4$ to $T_5$ depends on the heat transferred in cooling the gas between points $T_4$ and $T_5$ in FIG. 2 and the thermal influx into the enclosure. The mass flow rate as determined by a standard orifice meter and the gas density, which is inferred from the pressure and temperature measurements, is $1.45 \times 10^{-3}$ kg/s. The heat transferred in cooling between 10.8 and 9.4 K is thus 15.4 W, while the total heat absorbed by warming the gas from 7.3 to 9.3 K is 17.4 W. The difference, 2 W, is the thermal influx into the helium. Since this thermal influx occurs across a transmission line that is 35 mm in diameter having a length of at least 20 m in this one example, the thermal performance is 0.1 W/m.

In this example, the inside diameter of the insulating enclosure is 76 mm, so that the thermal performance, which is based on a smooth projected area of 0.24 $m^2/m$, is 0.42 $W/m^2$. When the total surface area of a corrugated tube of 0.39 $m^2/m$ is considered, the thermal influx is 0.25 $W/m^2$. A separate test of the thermal influx to a nitrogen radiation shield gave a result of 3 W/m, but such a shield is not critical for this application.

The overall heat transfer coefficient between the "go" and "return" streams was calculated to be 0.5 W/mk in this example, and the heat transfer coefficient in terms of area was 4.5 $W/m^2K$. It appeared that the controlling mode of heat transfer was natural convection on the outside of the superconducting means 17. In this example, the fluid velocity on the outside of the superconducting means in the return leg was 0.03 m/sec.

The temperature profile obtained was affected by the heat transfer rate and length. If the test section had operated as a better heat exchanger, it could be expected that the temperatures at points $T_4$ and $T_5$ in FIG. 2 would be reduced and approach the lower inversion temperature, while reducing the temperature difference along the length of the test section. FIG. 2 shows that the return gas 43 at point $T_4$ in FIG. 2 was considerably colder than the go gas at point $T_2$ in the same figure. This indicated that all the available refrigeration was not being used at the lowest temperature. Thus, the refrigeration could be used at a higher temperature to depress the temperature at point $T_2$ in FIG. 2. The fact that this did not occur indicates that the heat exchangers in the refrigerator, which comprised a Collins Cryostat, was not adequate, and that a larger heat load could be sustained in the test section of the transmission line between its opposite end terminals 15 and 15'.

The expansion engine normally operated with an 80% efficiency producing about 3.5° K of cooling with a 10° K inlet temperature. When desired, the expander efficiency and refrigeration production were reduced by heating the gas at the expander inlet (e.g. by supplying 40.5 W of heat). This matches the refrigerator capacity to the load and controls the temperature profile, but raising the stream pressure in the return direction accomplishes the same results.

In another test, the gas streams in the "go" and "return" directions were thermally separated in different enclosures, and the remote expander 53 was successfully employed therewith but with increased thermal heat flux and electrical loads. Moreover, the cool down was much smoother for the case where the counterstreaming liquid and gas streams were in thermal contact in the same enclosure. Additionally, temperature oscillation present in the thermally isolated streams in the "go" and "return" directions was immediately removed when the streams were in thermal contact in the same enclosure.

In one example, the cost of the described single enclosure 13 was typically $0.3 ± 10⁶/km, which compared to a cost of $63 × 10⁶ over a 100 km for two parallel enclosures. Thus, the single enclosure of this invention, with thermal contact between the "go" and "return" streams, can do the same job as two enclosures with a potential saving $31 × 10⁶. Additionally, a single enclosure with an internal vacuum barrier would be more complex and more costly than the described single enclosure with thermal contact between the "go" and "return" streams.

When operating with $Nb_3Sn$ as a conductor in the 6 to 12 K range, the refrigerator ratio is between 150 and 300. Refrigerator costs based on these ratios are low compared to enclosure costs. Thus, refrigeration efficiency is not the deciding factor in choosing a refrigerator process, and the refrigeration process that allows an overall reduction in the combined capital cost of the enclosure and refrigerators is advantageous.

In another example, the high pressure gas circulating in the go direction is under a pressure of 150 psia. Thereupon, the expander reduces the pressure on the high pressure gas to form the lower pressure gas 43 in the return direction under a pressure of 18 psia. Likewise, the coolant is introduced as a gas into the cooling channel 19 from the refrigerator at terminal 15 at a temperature of above about 10° K. Thereupon, the temperature of the coolant, is reduced by the expander 53, from whence the coolant is introduced into the annulus 41 in enclosure 13 between the superconductor 17 and the enclosure for circulation back to the refrigerator at the temperature range indicated for recompression in an endless cycle.

Of the overall data taken, those represented by FIG. 2 represent a good match between the refrigerator and the load. The temperature profile of FIG. 2 is the most representative of a well-designed refrigerator enclosure combination. Thus, not only is thermal isolation between the "go" and "return" streams not necessary when using $Nb_3Sn$ as the superconductor, but thermal contact between the "go" and "return" streams allows a potentially large enclosure cost saving. Additionally, in accordance with this invention the temperature environment of a superconducting cable may be adjusted by varying the refrigerator process and heat transfer parameters. Still further, this invention is able to provide a cable temperature distribution that tends to decrease with increasing distance from the refrigerator.

In the examples described above, the refrigerator was a Collins cryostat as described in BNL 19742, which is incorporated by reference herein.

In another example, employing an expander and a superconducting transmission line carrying power from an ac source 65 to a load 67, at a level below the critical current of the superconductor, helium was circulated from the refrigerator into the cable 11 through terminal 15 at a pressure of 1.2 MN/m² and a temperature of 8° K. As the helium passed through the cable 11 it was heated by the cable dielectric and hysteritic losses; however, at the same time it was cooled by the return helium stream. The return helium gas stream was at a temperature lower than the high pressure gas being circulated in the go direction due to the refrigeration effect of the expander, which was sufficient to cool the helium in the cable 11 so that the helium left the cable at point $T_3$ in FIG. 2 at a temperature lower than at the entrance through terminal 15. The helium expanded between points $T_3$ and $T_4$ in FIG. 2 to 0.2 MN/m² and returned to the cable annulus 41 in thermal contact with the cable. Thus, the cable 11 acted as if the cable was the final heat exchanger in the refrigerator.

This invention has the advantage of providing thermally contacting, oppositely streaming, gas streams at different pressures and temperature ranges in the same enclosure for insulating the streams from the ambient in a closed cycle for maintaining a superconductor in the enclosure below its critical superconducting temperature. To this end, this invention has the advantage of providing a simple relatively inexpensive enclosure having a refrigerator and an expander at the opposite ends thereof, and counterstreaming different pressure gas streams in thermal contact with each other for providing an input gaseous coolant that leaves the cable near its coldest point, and a superconductor temperature that decreases the refrigerator to the expander.

What is claimed is:
1. Cryogenic cooling apparatus for a consumer having a source of cryogenic cooling fluid under pressure for use with a longitudinally extending superconducting transmission line having an insulating enclosure with opposite terminals comprising:
   a. cryogenic cooling fluid;

b. longitudinally extending superconductor transmission line means forming a first channel for circulating the cryogenic cooling fluid in a first stream at a first temperature range and pressure in a first go direction;

c. enclosure means encircling the transmission line means and forming a second channel in thermal contact with the first channel and the transmission line means for circulating the cryogenic cooling fluid at a second temperature range and pressure in a second return direction opposite to said first go direction;

d. first means for circulating the cryogenic fluid as a high pressure gas in the first channel at said first temperature range and pressure; and e. second means for circulating the cryogenic cooling fluid as a gas in the second channel at said second temperature range and pressure to provide thermally contacting, oppositely streaming, cryogenic fluid streams in the same enclosure in a closed cycle at said different temperatures and pressures, respectively.

2. The apparatus of claim 1 in which the cryogenic cooling fluid is helium.

3. The apparatus of claim 2 in which the first means is a refrigerator means source of cryogenic cooling fluid in a pressurized gas state at a first pressure that communicates with the first channel for circulating pressurized gas in the first go direction at first temperatures from $T_2$ to $T_3$.

4. The apparatus of claim 3 in which the second means is an expander means for receiving the high pressure gas, expanding the high pressure gas to a lower pressure gas, and transmitting the gas at the second pressure and temperature range from $T_4$ to $T_5$, which is lower than the first temperature range and pressure.

5. The apparatus of claim 4 in which the refrigerator and expander are arranged at opposite ends of the transmission line, so that the refrigerator compresses the gas, and the expander expands the high pressure gas to a lower pressure for endlessly circulating the cryogenic cooling fluid with a skewed temperature along the length of the transmission line that decreases in the first go direction due to the cooling effect of the low pressure gas on the high pressure gas, and so that the high pressure gas leaves the transmission line near its coolest point.

6. The apparatus of claim 5 in which the respective channels contain high and low pressure fluid streams of He in its supercritical pressure states respectively in said first go and second return directions.

7. The apparatus of claim 6 in which the transmission line contains annularly wound superconductors.

8. The apparatus of claim 7 having enclosure means containing a pressurized gas in a cross-sectional area that is larger than the cross-sectional area of the first channel for the high pressure gas in the go direction.

9. A process for cooling a consumer, comprising a longitudinally extending superconducting transmission line for transmitting electrical power, comprising the steps of:

a. forming an endless, longitudinally extending, closed circuit having cryogenic cooling fluid, thermally contacting, oppositely streaming, inner and outer streams in go and return legs that are in thermal contact with each other and a superconducting transmission line while insulating the same from the ambient at a temperature $T_1$ to maintain the streams at temperatures between $T_2$ and $T_3$ and $T_4$ and $T_5$ respectively that are below the critical temperature of the superconducting transmission line;

b. refrigerating the fluid at one end of the line for feeding a gaseous cryogenic cooling fluid at high pressure and at a temperature $T_2$ into the go leg;

c. expanding the gaseous cryogenic cooling fluid at the other end of the line for feeding a cooler gas into the return leg at a reduced pressure and at a temperature $T_4$;

d. circulating the cooled gas back again to he refrigerator at a refrigerator inlet temperature of $T_5$ where $T_2>T_3$ and $T_5>T_4$; and e. recompressing the gas into a high pressure gas in the refrigerator for endlessly circulating the fluid in the circuit so that the go leg is cooled by the gas as it progresses along the transmission line in the go leg and enters the expander at a point near its coldest point where the gas enters the return leg, and the gas leaves the line at high pressure.

10. The method of claim 9 in which the high pressure gas directly contacts the transmission line, and the lower pressure gas surrounds the high pressure gas with the transmission line forming a partition therebetween separating the two, and enclosing both the transmission line cable and the high pressure gas in the same enclosure so that the high pressure gas and low pressure gas maintain the transmission line below its critrical superconducting temperature, and transmitting electrical power through the transmission line below its critical current.

* * * * *